(12) United States Patent
Ponnada

(10) Patent No.: US 11,542,916 B2
(45) Date of Patent: Jan. 3, 2023

(54) WIND TURBINE BLADE WITH THERMALLY CONDUCTING ELECTRICAL INSULATION

(71) Applicant: Siemens Gamesa Renewable Energy A/S, Brande (DK)

(72) Inventor: Sri Markandeya Rajesh Ponnada, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/140,189

(22) Filed: Jan. 4, 2021

(65) Prior Publication Data

US 2021/0207575 A1   Jul. 8, 2021

(30) Foreign Application Priority Data

Jan. 8, 2020   (EP) ..................................... 20150748

(51) Int. Cl.
*F03D 80/40* (2016.01)
*F03D 1/06* (2006.01)
*F03D 80/30* (2016.01)

(52) U.S. Cl.
CPC .......... *F03D 1/0675* (2013.01); *F03D 80/30* (2016.05); *F03D 80/40* (2016.05); *F05B 2240/221* (2013.01)

(58) Field of Classification Search
CPC ................................. F03D 80/40; F03D 80/30
See application file for complete search history.

(56) References Cited

U.S. PATENT DOCUMENTS

| | | | | |
|---|---|---|---|---|
| 6,612,810 | B1 * | 9/2003 | Olsen ...................... | F03D 80/40 415/908 |
| 9,421,742 | B2 * | 8/2016 | Grove-Nielsen ........ | H05B 3/18 |
| 9,482,208 | B2 * | 11/2016 | Loewe .................... | F03D 80/40 |
| 9,689,377 | B2 * | 6/2017 | Klein ...................... | F03D 80/30 |
| 9,759,198 | B2 * | 9/2017 | Lauritsen .............. | F03D 1/0675 |
| 10,066,608 | B2 * | 9/2018 | Krueger .................. | F03D 80/50 |
| 10,294,925 | B2 * | 5/2019 | Klein ..................... | F03D 1/0675 |
| 10,648,456 | B2 * | 5/2020 | Shain ..................... | F03D 80/30 |
| 2008/0181775 | A1 * | 7/2008 | Livingston .............. | F03D 80/30 416/95 |

(Continued)

FOREIGN PATENT DOCUMENTS

| | | | | |
|---|---|---|---|---|
| CN | 206770133 U | | 12/2017 | |
| DE | 19748716 C1 | * | 11/1998 | ........... B64C 27/473 |

(Continued)

OTHER PUBLICATIONS

English translation of DE19748716C1 (Year: 1998).*

(Continued)

*Primary Examiner* — Topaz L. Elliot
*Assistant Examiner* — Wesley Le Fisher
(74) *Attorney, Agent, or Firm* — Schmeiser, Olsen & Watts LLP

(57) ABSTRACT

Provided is a blade for a wind turbine including a structure having: a suction side and a pressure side extending between a leading edge and the trailing edge, a conducting or semi-conducting element. The blade further includes: a thermally conducting electrical insulation, at least partially in contact with the structure.

15 Claims, 6 Drawing Sheets

(56) References Cited

U.S. PATENT DOCUMENTS

| | | | |
|---|---|---|---|
| 2011/0142678 A1* | 6/2011 | Santiago | F03D 80/30 |
| | | | 416/241 R |
| 2014/0199170 A1* | 7/2014 | Madsen | B23P 15/04 |
| | | | 416/95 |
| 2014/0356187 A1* | 12/2014 | Wong | F03D 80/40 |
| | | | 416/96 R |
| 2015/0283653 A1 | 10/2015 | Krueger et al. | |
| 2018/0084613 A1* | 3/2018 | Hu | H05B 1/0236 |
| 2018/0112649 A1* | 4/2018 | Shain | F03D 1/0675 |
| 2019/0264658 A1* | 8/2019 | Li | F03D 80/40 |

FOREIGN PATENT DOCUMENTS

| | | | | |
|---|---|---|---|---|
| DE | 102008006427 A1 | 7/2008 | | |
| EP | 2926984 A1 | 10/2015 | | |
| EP | 3530936 A1 | 8/2019 | | |
| WO | WO-2010028653 A2 * | 3/2010 | | B82Y 15/00 |
| WO | WO 2018219511 A1 | 12/2018 | | |

OTHER PUBLICATIONS

European Search Report and Written Opinion of the European Searching Authority dated Jul. 10, 2020 for Application No. 20150748.0.

https://precision-ceramics.com/ —Technical Ceramic Solutions & Services.

* cited by examiner

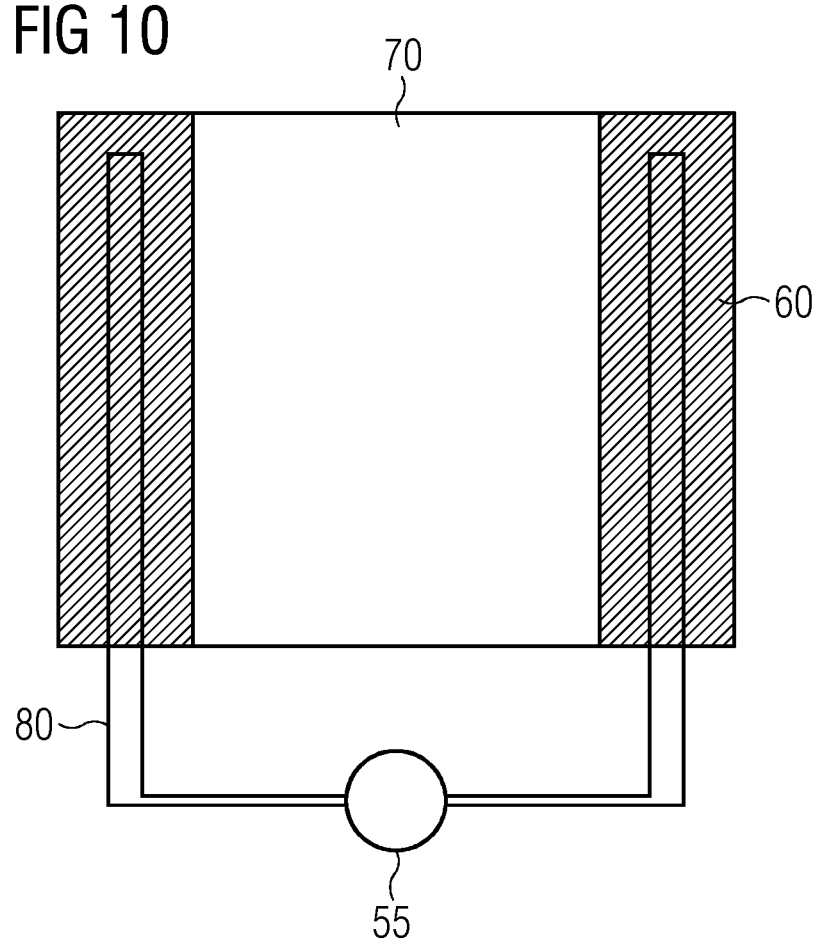

WIND TURBINE BLADE WITH THERMALLY CONDUCTING ELECTRICAL INSULATION

CROSS-REFERENCE TO RELATED APPLICATIONS

This application claims priority to European Application No. 20150748.0, having a filing date of Jan. 8, 2020, the entire contents of which are hereby incorporated by reference.

FIELD OF TECHNOLOGY

The following relates to a blade for a wind turbine. More in particular, the following relates to an electrical and/or a lightning protection and/or a heating and/or deicing arrangement for a blade of a wind turbine.

BACKGROUND

Rotor blades, being the most exposed part of the wind turbine, are frequently subjected to lightning strikes. The probability of strikes is highest at tip end and decreases as one proceeds towards the root. The addition of metallic, carbon or other conducting (or semi-conducting) elements on the exterior (or towards exterior) of the blade surface, for example as part of a resistive or inductive heating system for de-icing, or structural components (e.g., carbon spar caps) increases the risk of lightning attachment. This can damage not only the conducting elements but also the blade structure. Owing to this, one measure which is for example adopted is that of pulling conducting elements back from the blade tip. Further conducting elements may be also conveniently placed away from trailing edge where lightning is expected to hang on for a prolonged time. Equipotential bonds are provided between different conducting or semi-conducting elements for voltage equalization, which otherwise would lead to electrical flashovers inside the blade.

It is desirable to provide a blade for a wind turbine enabling conducting components to be placed at any location along the blade with reduced or no risk of lightning attachment or internal flashovers.

SUMMARY

An aspect relates to a blade for a wind turbine including a structure having:
- a suction side and a pressure side extending between a leading edge and the trailing edge,
- a conducting or semi-conducting element.

The blade further includes a thermally conducting electrical insulation, at least partially in contact with the structure.

According to embodiments of the present invention, the thermally conducting electrical insulation is at least partially in contact with the conducting or semi-conducting element.

The above-described arrangement allows to placing conducting components in any position along the blade between the tip and the root. The conducting components in contact with the conducting or semi-conducting element may be positioned also close to the trailing edge. The above-described arrangement reduces or prevent the risk of lighting attachment, also allowing for satisfactory heat transfer.

According to embodiments of the present invention, the conducting or semi-conducting element is a resistive or inductive heating element for heating the blade, for example used for de-icing. De-icing can therefore be achieved with high efficiency and safety. Embodiments of the present invention allow heating of zones where traditional de-icing elements may not be allowed, for example due to risk of erosion or high-voltage flashover, thus improving flexibility and efficiency.

According to embodiments of the present invention, the conducting or semi-conducting element is a structural element of the blade. For example, the structural element may be a spar cap. Particularly the structural element may be a spar cap used as blade heating elements.

According to embodiments of the present invention, the conducting or semi-conducting element is a sensing, actuating or communications element or a part thereof.

According to embodiments of the present invention, the conducting or semi-conducting element is a component of a lightning protection system. Conducting elements which are introduced into the blade and run parallel to a lightning protection system (LPS) down conductor, a voltage equalization needs to be provided between the conducting elements and the down conductor through equipotential bonding, failing which there is a high risk of internal flashovers leading to structural damage. Such equipotential bonds, especially when made between dissimilar materials (e.g., metal and carbon), is a weak zone and can be easily destroyed by the heat produced while transferring lightning currents. The use of a thermally conducting electrical insulation over the bonding and/or over the down conductor and/or over the conducting or semi-conducting element provides for the necessary heat dissipation.

According to embodiments of the present invention, the thermally conducting electrical insulation is provided in the form of a layer over the conducting or semi-conducting heating element. The use of a layer may be desirable where electrical insulation is highly critical. A thermally conducting electrical insulation layer may be applied during blade casting or after. A continuous layer of a thermally conducting electrical insulation may be applied via adhesion, cold spray, roller or dip coating, etc. A continuous layer of a thermally conducting electrical insulation may be incorporated as a sandwich layer during casting (or pre-casting) of blades.

According to other embodiments of the present invention, the thermally conducting electrical insulation is provided in a discontinuous form. A discontinuous layer of a thermally conducting electrical insulation may be applied through the above-mentioned methods. Further, reinforcing the blade structural material with thermally conducting electrical insulation particles, fibres, mats, etc. may be performed.

According to embodiments of the present invention, the thermally conducting electrical insulation may be provided as an inner surface or as an outer surface of the suction side and/or the pressure side of the blade.

According to embodiments of the present invention, the thermally conducting electrical insulation comprises aluminium nitride or boron nitride or a mixture thereof. In particular, hexagonal boron nitride (>99%, self-bonded) may be used.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention are not limited.

BRIEF DESCRIPTION

Some of the embodiments will be described in detail, with references to the following Figures, wherein like designations denote like members, wherein:

FIG. 10 shows a schematic view of a fifth embodiment of a rotor blade.

DETAILED DESCRIPTION

The drawings are in schematic form. Similar or identical elements are referenced by the same or different reference signs.

Figure 1:
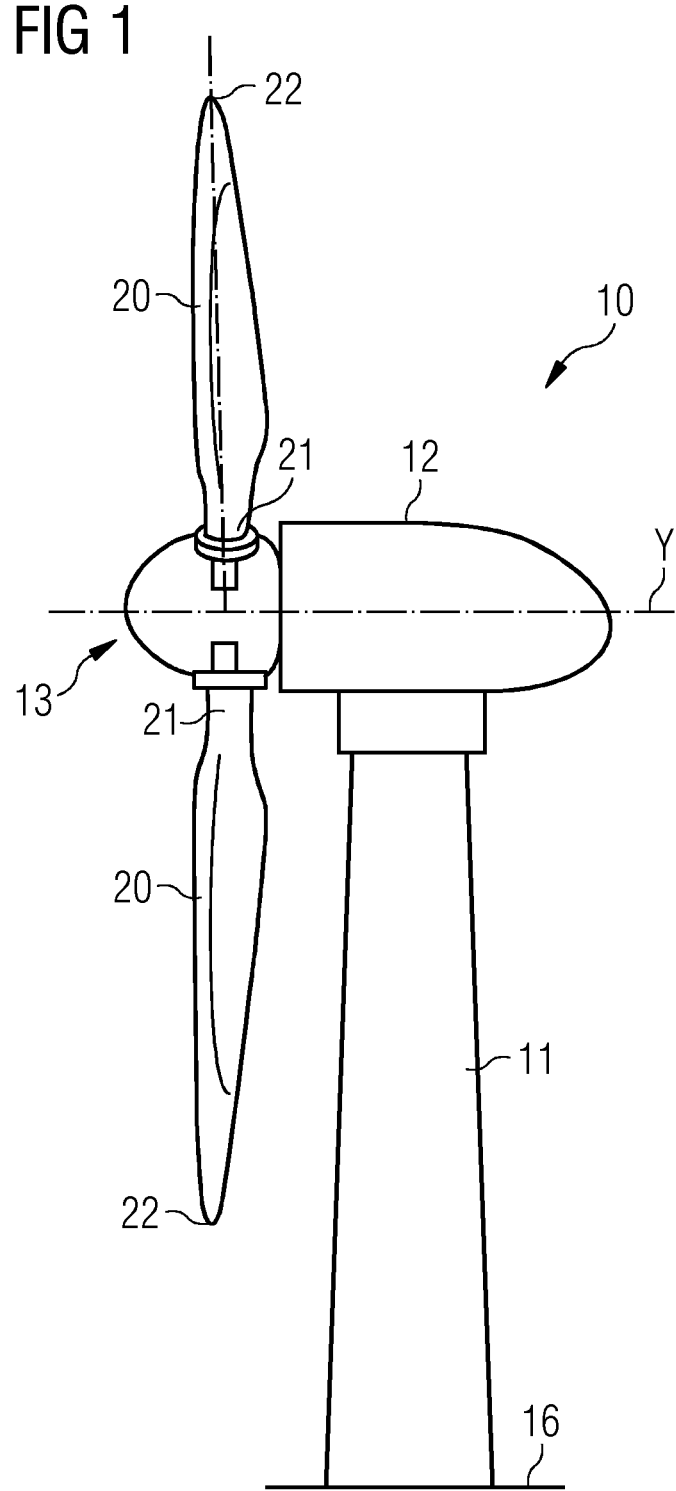
FIG. 1 shows a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is rotatably mounted over the tower 11, which comprises a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y. The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 4 extend substantially radially with respect to the rotational axis Y. Each rotor blade 20 is usually mounted pivotable to the hub 13, in order to be pitched about respective pitch axes X. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade.

Figure 2:
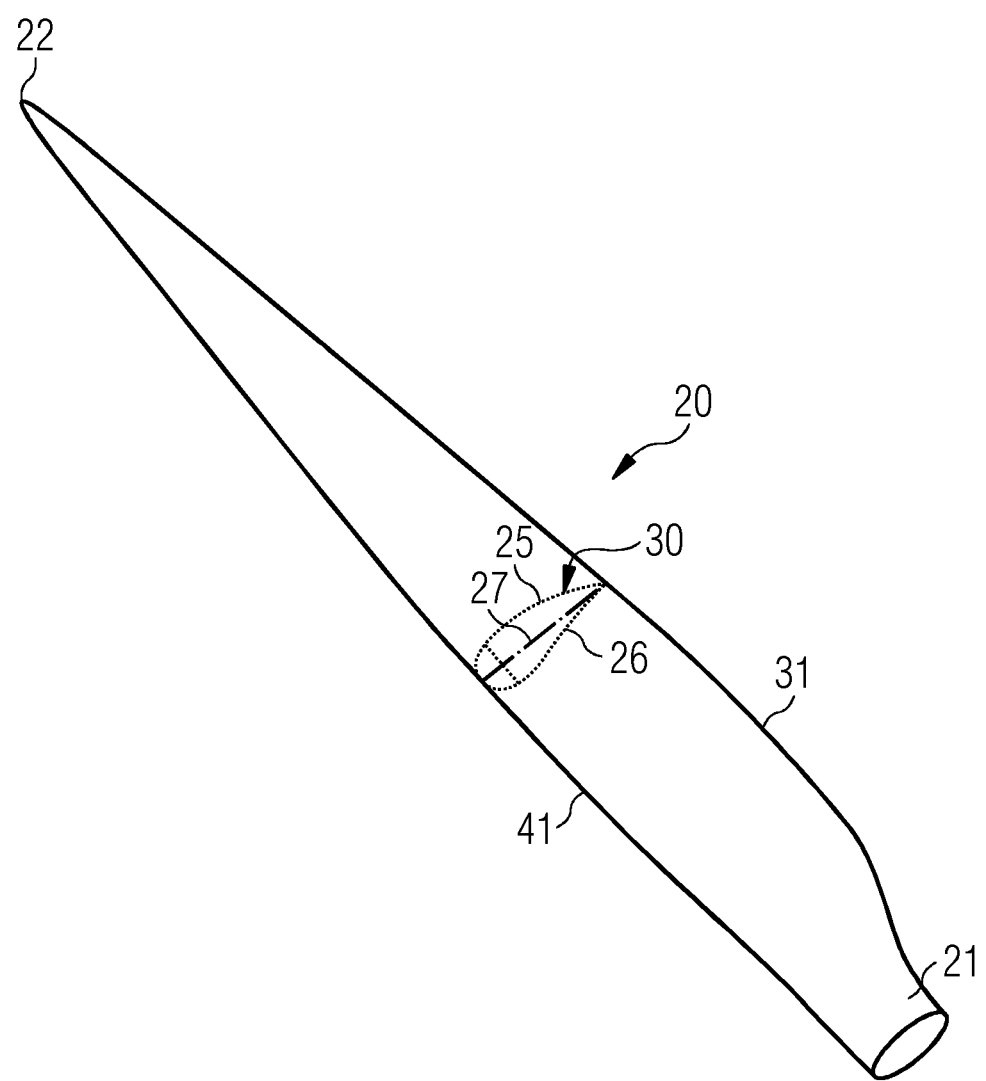
FIG. 2 shows a rotor blade of a wind turbine.

FIG. 2 illustrates the rotor blade 20 more in detail. Between the root section 21 and the tip section 22 the rotor blade 20 furthermore comprises a plurality of aerofoil sections 30 distributed between the root section 21 and the tip section 22 for generating lift. Each aerofoil section 30 comprises a suction side 25 and a pressure side 26. The suction side 25 is divided or separated from the pressure side 26 by a chord line 27 which connects a leading edge 41 with a trailing edge 31 of the rotor blade 20. The suction side 25 and the pressure side 26 may be connected by one or more transversal shear webs 28 (one shear web 28 in the embodiment of FIG. 3), which provide a reinforcement where the distance between the suction side 25 and the pressure side 26 are greater, i.e., at an intermediate position along the chord line 27, between the leading edge 41 and the trailing edge 31.

Figure 3:
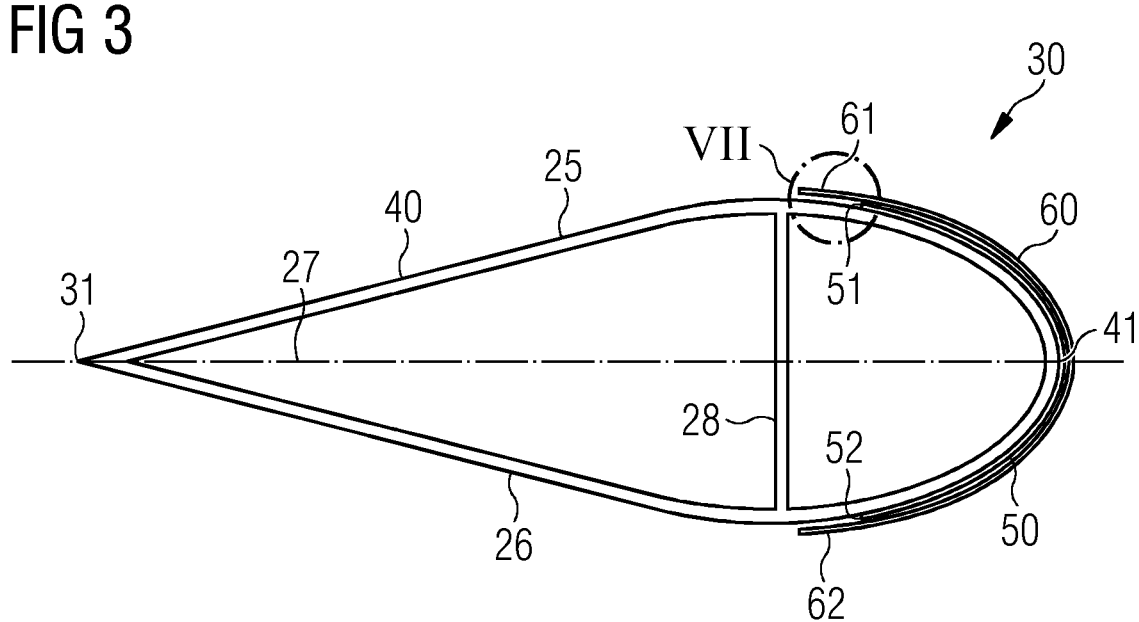
FIG. 3 shows a section view of a first embodiment of a rotor blade.

FIG. 3 illustrates an aerofoil section 30 more in detail. The aerofoil section 30 includes a basic structure 40 comprising the suction side 25, the pressure side 26 and one shear web 28. The basic structure 40 may be manufactured as a blade laminate. At the leading edge 41 the aerofoil section 30 comprises a resistive or inductive heating element 50 in the form of a thin layer to be connected to a source of electrical energy. According to other embodiments of the present invention, the heating element 50 may be provided in a shape different from a thin layer. The heating element 50 spans between a first end 51 and an opposite second end 52. The first end 51 and the opposite second end 52 may be respectively provided on the suction side 25 and on the pressure side 26. The heating element 50 may be provided on the portion of the basic structure 40 comprised between the leading edge 41 and the shear web 28. The heating element 50 may be also or alternatively provided on the portion of the basic structure 40 comprised between the trailing edge 31 and the shear web 28. The heating element 50 may be symmetrically configured with respect to the chord line 27. According to other embodiments of the present invention, the heating element 50 may be not symmetrical to with respect to the chord line 27. According to embodiments of the present invention, the heating element 50 may be completely provided on the suction side 25 or on the pressure side 26. The aerofoil section 30 further comprises a thermally conducting electrical insulation 60 over the resistive heating element 50. The thermally conducting electrical insulation 60 is provided as a thin layer. According to other embodiments of the present invention, the thermally conducting electrical insulation 60 may be provided in a shape different from a thin layer. The thermally conducting electrical insulation 60 spans between a first terminal section 61 and an opposite second terminal section 62, respectively covering the first end 51 and the second end 52 of the heating element 50. The first terminal section 61 and the second terminal section 62 respectively extend beyond the first end 51 and the second end 52, as shown in FIG. 3. According to other embodiments of the present invention (not shown), the first terminal section 61 and the second terminal section 62 do not extend beyond the first end 51 and the second end 52.

Figure 4:
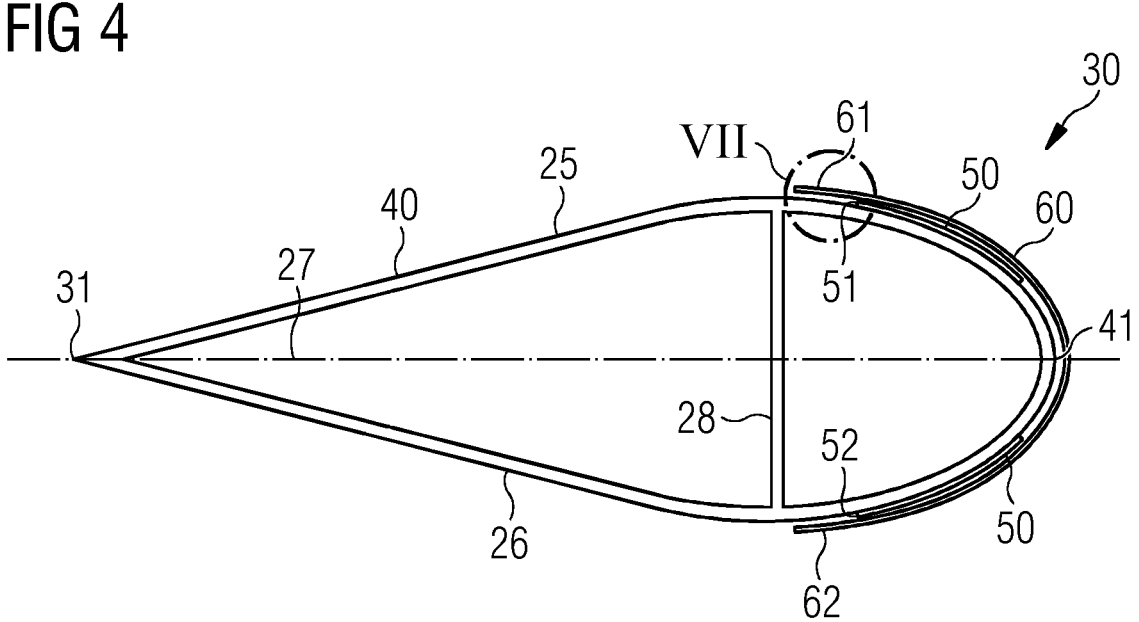
FIG. 4 shows a section view of a second embodiment of a rotor blade.

FIG. 4 illustrates another embodiment of the aerofoil section 30. This second embodiment differentiates itself from the embodiment of FIG. 3 in that more than one heating element 50 is provided. According to such embodiment two heating elements 50 are provided on the portion of the basic structure 40 comprised between the leading edge 41 and the shear web 28, respectively on the suction side 25 and on the pressure side 26. According to other embodiments of the present invention (not shown), the two heating elements 50 may be provided on other positions on the basic structure 40. According to other embodiments of the present invention (not shown), more than two heating elements 50 may be provided.

Figure 5:
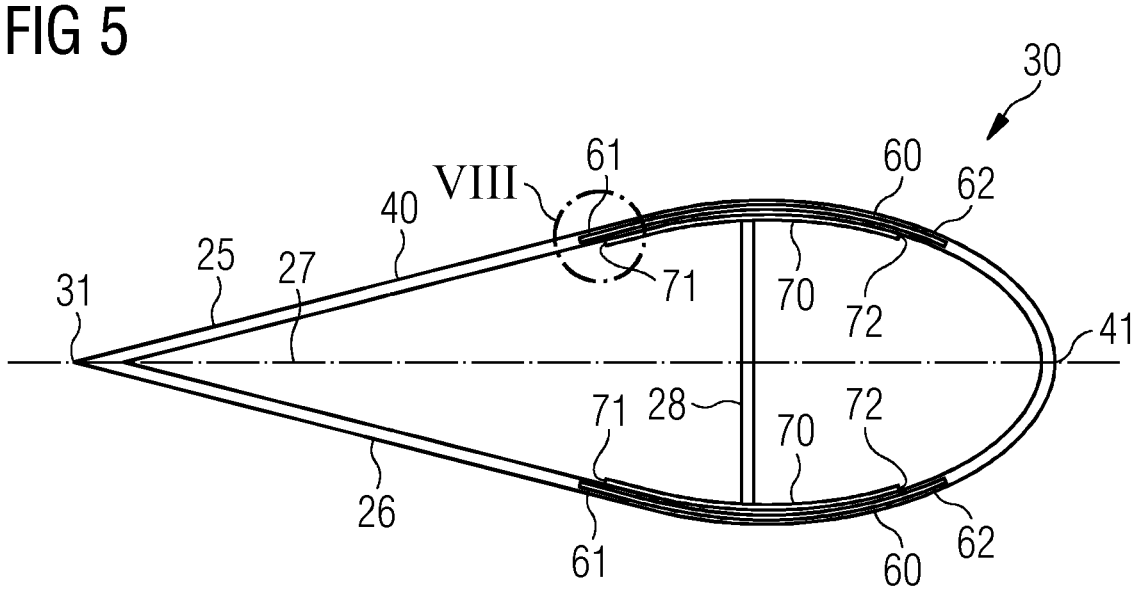
FIG. 5 shows a section view of a third embodiment of a rotor blade.

FIG. 5 illustrates another embodiment of the aerofoil section 30. In this third embodiment the aerofoil section 30 comprises two spar caps 70 in the suction side 25 and in the pressure side 26, at the two opposite ends of the shear web 28. The spar caps 70 cooperate with the shear web 28 for providing structural reinforcement to the aerofoil section 30.

Each spar cap 70 spans between a first end 71 and an opposite second end 72. The aerofoil section 30 further comprises two thermally conducting electrical insulation 60 over the two spar caps 70, respectively, but not in contact with them. The two thermally conducting electrical insulation 60 are respectively provided on outer surfaces of the suction side 25 and the pressure side 26. The thermally conducting electrical insulation 60 is provided as a thin layer. According to other embodiments of the present invention, the thermally conducting electrical insulation 60 may be provided in a shape different from a thin layer. Each thermally conducting electrical insulation 60 spans between a first terminal section 61 and an opposite second terminal section 62, respectively covering the first end 71 and the second end 72 of a respective spar cap 70.

Figure 6:
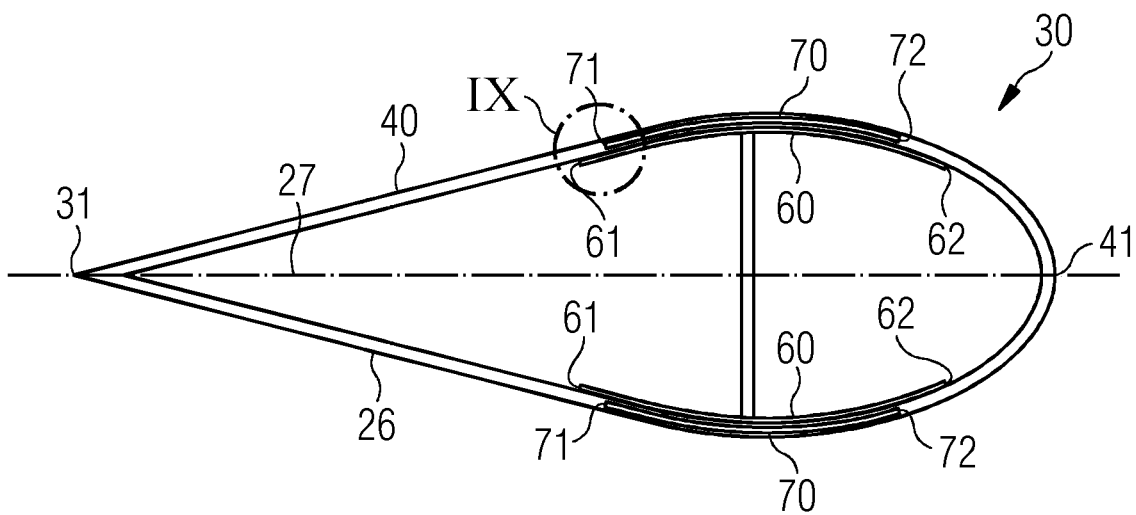
FIG. 6 shows a section view of a fourth embodiment of a rotor blade.

FIG. 6 illustrates another embodiment of the aerofoil section 30. This fourth embodiment differentiates itself from the embodiment of FIG. 5 in that the two thermally conducting electrical insulation 60 are respectively provided on inner surfaces of the suction side 25 and the pressure side 26.

Figure 7:
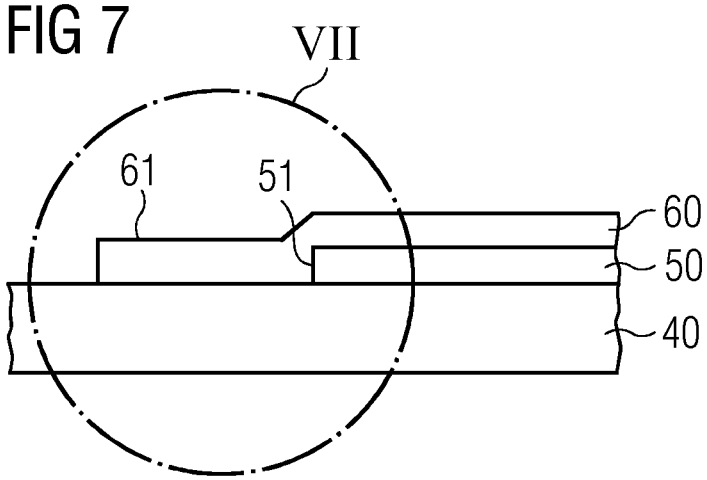
FIG. 7 shows a magnified view of the detail VII of FIGS. 3 and 4.

FIG. 7 illustrates more in detail, for the embodiments of FIGS. 3 and 4, the boundaries of the thermally conducting electrical insulation 60, i.e., how the first terminal section 61 and the second terminal section 62 cover the first end 51 and the second end 52 of the heating element 50. The first terminal section 61 and the second terminal section 62 extends beyond the first end 51 and the second end 52, i.e. the first terminal section 61 and the second terminal section 62 are in direct contact with basic structure 40. This permits to spread the thermal energy.

Figure 8:
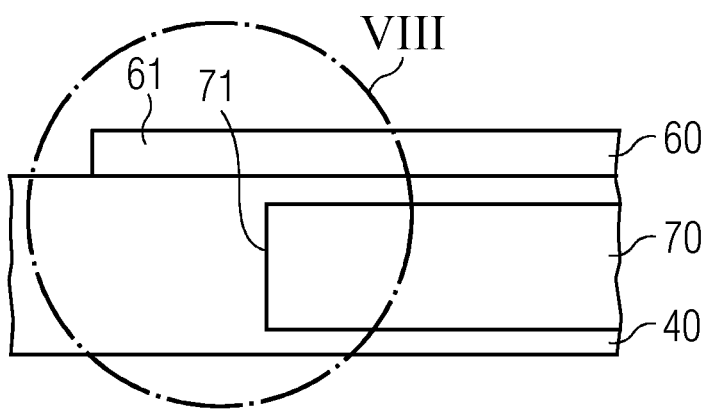
FIG. 8 shows a magnified view of the detail VIII of FIG. 5.
Figure 9:
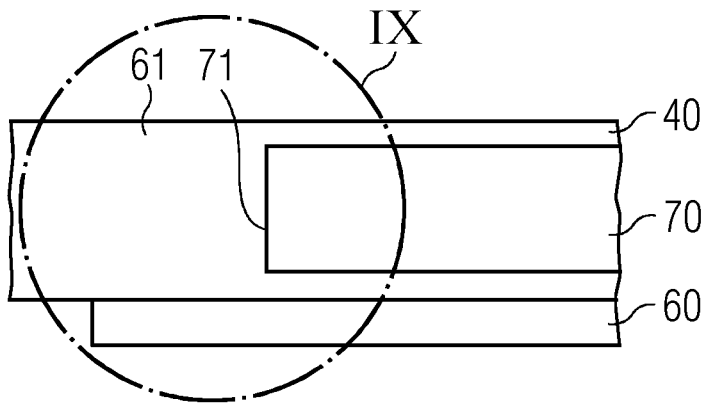
FIG. 9 shows a magnified view of the detail IX of FIG. 6.

FIGS. 8 and 9 illustrates more in detail, respectively for the embodiments of FIGS. 5 and 6, how the thermally conducting electrical insulation 60 is positioned with respect to the two spar caps 70 in the suction side 25 and in the pressure side 26. The thermally conducting electrical insulation 60 is in direct contact with the suction side 25 and in the pressure side 26, but distanced from the two spar caps 70. The first terminal section 61 and the second terminal section 62 extends beyond the first end 71 and the second end 72.

FIG. 10 shows the use of the thermally conducting electrical insulation 60 over a heating element. The heating element may be a spar cap 70 or section thereof. A conductor 80 is provided in contact with spar cap 70 and connected to a source of current 55. The current flow through the conductor 80 and the spar cap 70, providing heating through Joule's effect. in a high temperature zone due to electrical connection between dissimilar materials for heat dissipation. respective thermally conducting electrical insulations 80 are provided over the conductors 80 and the portions of the spar cap 70 adjacent to the conductors 80, thus allowing heat dissipation and preventing damage from excess heating.

According to other embodiments of the present invention (not shown), the thermally conducting electrical insulation 60 (TCEI) is provided into a more discontinuous form than a thin layer. For example, the thermally conducting electrical insulation 60 may be provided as reinforcement or hybridization of the basic structure 40. The thermally conducting electrical insulation 60 may be applied during blade casting or after. The thermally conducting electrical insulation 60 in the form of a layer may be applied via adhesion, cold spray, roller or dip coating or other techniques. The thermally conducting electrical insulation 60 in the form of a layer may be incorporated in a sandwich layer structure during casting (or pre-casting) of blades. The thermally conducting electrical insulation 60 may be provided as an inner surface or as an outer surface of the suction side 25 and/or the pressure side 26. The thermally conducting electrical insulation 60 in a discontinuous form may be manufactured by using the above-described methods (adhesion, cold spray, roller, dip coating, etc.). Reinforcing the basic structure 40 with TCEI particles, fibers, mats etc., may also be performed.

The thermally conducting electrical insulation 60 may be made of aluminum nitride or boron nitride, in particular hexagonal boron nitride (>99%, self-bonded). Furthermore, the different materials could be used in tandem in a layered or mixed configuration.

Although the present invention has been disclosed in the form of preferred embodiments and variations thereon, it will be understood that numerous additional modifications and variations could be made thereto without departing from the scope a the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A blade for a wind turbine including a structure having:
   a suction side and a pressure side extending between a leading edge and the trailing edge,
   a pair of conducting or semi-conducting elements, further wherein a first conducting or semi-conducting element of the pair of conducting or semi-conducting elements forms a first spar cap and a second conducting or semi-conducting element of the pair of conducting or semi-conducting elements forms a second spar cap, and wherein at least one of the first spar cap and the second spar cap is a blade heating element or includes a blade heating element,
   wherein the blade further includes:
      a thermally conducting electrical insulation, at least partially in contact with the structure and distanced from the first spar cap and the second spar cap.

2. The blade according to claim 1, wherein the thermally conducting electrical insulation is provided in the form of a layer over the pair of conducting or semi-conducting elements.

3. The blade according to claim 2, wherein the thermally conducting electrical insulation is provided as an outer surface of the suction side and/or the pressure side of the blade.

4. The blade according to claim 1, wherein the thermally conducting electrical insulation is provided in a discontinuous form.

5. The blade according to claim 4, wherein the thermally conducting electrical insulation is provided as reinforcement or hybridization of the suction side and/or the pressure side of the blade.

6. The blade according to claim 1, wherein the blade heating element is a resistive or inductive heating element for heating the blade.

7. The blade according to claim 1, wherein the thermally conducting electrical insulation comprises aluminium nitride.

8. The blade according to claim 1, wherein the thermally conducting electrical insulation comprises boron nitride.

9. A wind turbine including the blade according to claim 1.

10. A blade for a wind turbine including a structure having:
    a suction side and a pressure side extending between a leading edge and the trailing edge, a conducting or semi-conducting element, wherein the conducting or semi-conducting element is a spar cap of the blade, and wherein the conducting or semi-conducting element is a resistive or inductive heating element for heating the blade;

wherein the blade further includes:
a thermally conducting electrical insulation, wherein the thermally conducting electrical insulation is at least partially in contact with the suction side and/or the pressure side proximate the spar cap, and wherein the thermally conducting electrical insulation is distanced from the spar cap of the blade.

11. The blade according to claim 10, wherein the thermally conducting electrical insulation is provided in the form of a layer over a portion of the suction side and/or the pressure side proximate the conducting or semi-conducting element.

12. The blade according to claim 10, wherein the thermally conducting electrical insulation is provided as an inner surface and/or as an outer surface of at least one of the suction side and/or the pressure side of the blade.

13. The blade according to claim 10, wherein the thermally conducting electrical insulation is provided in a discontinuous form.

14. The blade according to claim 10, wherein the thermally conducting electrical insulation is provided as reinforcement or hybridization of the suction side and/or the pressure side of the blade.

15. The blade according to claim 10, wherein the thermally conducting electrical insulation comprises aluminium nitride or boron nitride.

* * * * *